United States Patent
Yared

(10) Patent No.: US 8,824,339 B2
(45) Date of Patent: *Sep. 2, 2014

(54) LAWFULL CALL INTERCEPTION SUPPORT

(75) Inventor: Marlene Yared, Dollard des Ormeaux (CA)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 150 days.

This patent is subject to a terminal disclaimer.

(21) Appl. No.: 13/492,482

(22) Filed: Jun. 8, 2012

(65) Prior Publication Data

US 2013/0094406 A1    Apr. 18, 2013

Related U.S. Application Data

(63) Continuation of application No. 12/643,722, filed on Dec. 21, 2009, now Pat. No. 8,218,456.

(51) Int. Cl.
| | | |
|---|---|---|
| *H04L 12/16* | (2006.01) | |
| *H04M 1/24* | (2006.01) | |
| *H04L 29/06* | (2006.01) | |
| *H04M 7/00* | (2006.01) | |
| *H04M 3/22* | (2006.01) | |

(52) U.S. Cl.
CPC .......... *H04L 63/306* (2013.01); *H04L 63/30* (2013.01); *H04L 65/1036* (2013.01); *H04L 65/1076* (2013.01); *H04M 2207/14* (2013.01); *H04M 7/006* (2013.01); *H04M 3/2281* (2013.01); *H04L 29/06* (2013.01)
USPC .......................................... 370/259; 379/35

(58) Field of Classification Search
None
See application file for complete search history.

(56) References Cited

U.S. PATENT DOCUMENTS

| | | | | |
|---|---|---|---|---|
| 7,620,389 B2* | 11/2009 | Kallio et al. | ........... | 455/414.1 |
| 7,657,011 B1* | 2/2010 | Zielinski et al. | ......... | 379/93.02 |
| 8,548,132 B1* | 10/2013 | Zielinski et al. | ......... | 379/93.02 |
| 2004/0157629 A1* | 8/2004 | Kallio et al. | ........... | 455/466 |
| 2007/0025370 A1* | 2/2007 | Ghasem et al. | ........... | 370/401 |
| 2009/0268885 A1* | 10/2009 | Portman et al. | ......... | 379/88.17 |
| 2011/0270977 A1* | 11/2011 | Ansiaux et al. | ............ | 709/224 |

OTHER PUBLICATIONS

PacketCable 1.5 Specifications, Electronic Surveillance, PKT-SP-ESP1.5-I02-070412, issued on Apr. 12, 2007, pp. 1-54.
PacketCable 2.0, Electronic Surveillance Intra-Network Specification, PKT-SP-ES-INF-I04-080425, Released Apr. 25, 2008, pp. 1-57.
Hautakorpi J. et al.: "Requirements from SIP (Session Initiation Protocol) Session Border Control Deployments"; XP015061334, Jan. 5, 2009; 25 pages.
Van Elburg, J.—Ericsson Telecommunicatie B.V.: The Session Initiation Protocol (SIP) P-Served-User Private-Header (P-Header) for the 3GPP IP Multimedia (IM) Core Network (CN) Subsystem; XP015060053, Sep. 7, 2008; 15 pages.
International Search Report for PCT/IB2010/055996 dated Jun. 9, 2011; 4 pages.

* cited by examiner

*Primary Examiner* — Chi Pham
*Assistant Examiner* — Soon-Dong D Hyun
(74) *Attorney, Agent, or Firm* — Ericsson Canada Inc.; David J. Rahmer

(57) ABSTRACT

Systems, methods and communication nodes according to exemplary embodiments provide for an IMS node to replicate call content for lawful call interception in packet cable networks. A CSCF node sends a command to an SBC node to perform call content replication for an identified call to be intercepted. The SBC node forwards the replicated call content to a delivery function, which in turn forwards the replicated call content to the appropriate law enforcement agency.

18 Claims, 16 Drawing Sheets

```
<xs:complexType name="tInitialFilterCriteria">
    <xs:sequence>
        <xs:element name="Priority" type="tPriority"/>
        <xs:element name="TriggerPoint" type="tTrigger" minOccurs="0"/>
        <xs:element name="ApplicationServer" type="tApplicationServer"/>
        <xs:element name="ProfilePartIndicator" type="tProfilePartIndicator" minOccurs="0"/>
        <xs:element name="Extention" type="tExtention" minOccurs="0"/>
        <xs:any namespace="##other" processContents="lax" minOccurs="0" maxOccurs="unbounded"/>
    </xs:sequence>
</xs:complexType>
```

Fig. 7

```
<xs:complexType name="tApplicationServer">
    <xs:sequence>
        <xs:element name="ServerName" type="tSIP_URL"/>
        <xs:element name="DefaultHandling" type="tDefaultHadling" minOccurs="0"/>
        <xs:element name="ServiceInfo" type="tServiceInfo" minOccurs="0"/>
        <xs:element name="Extention" type="tApplicationServerExtention" minOccurs="0"/>
        <xs:any namespace="##other" processContents="lax" minOccurs="0" maxOccurs="unbounded"/>
    </xs:sequence>
</xs:complexType>
```

Fig. 8

```
<xs:complexType name="tTrigger">
    <xs:sequence>
        <xs:element name="ConditionTypeCNF" type="tBool"/>
        <xs:element name="SPT" type="tSePoTri" maxOccurs="unbounded"/>
        <xs:element name="Extension" type="tExtension" minOccurs="0"/>
        <xs:any namespace="##other" processContents="lax" minOccurs="0" maxOccurs="unbounded"/>
    </xs:sequence>
</xs:complexType>
```

Fig. 9

```
<xs:complexType name="tSePoTri">
    <xs:sequence>
        <xs:element name="ConditionNegated" type="tBool" default="0" minOccurs="0"/>
        <xs:element name="Group" type="tGroupID" maxOccurs="unbounded"/>
        <xs:choice>
            <xs:element name="RequestURI" type="tString"/>
            <xs:element name="Method" type="tString"/>
            <xs:element name="SIPHeader" type="tHeader"/>
            <xs:element name="SessionCase" type="tDirectionOfRequest"/>
            <xs:element name="SessionDescription" type="tSessionDescription"/>
        </xs:choice>
        <xs:element name="Extension" type="tSePoTriExtension" minOccurs="0"/>
        <xs:any namespace="##other" processContents="lax" minOccurs="0" maxOccurs="unbounded"/>
    </xs:sequence>
</xs:complexType>
```

Fig. 10

Originating Trigger Definition :

```
<InitialFilterCriteria>
   <Priority>1</Priority>
      <TriggerPoint>
         <ConditionTypeCNF>0</ConditionTypeCNF>
         <SPT>
            <ConditionNegated>0</ConditionNegated>
            <Group>0</Group>
            <Method>INVITE</Method>
         </SPT>
         <SPT>
            <ConditionNegated>0</ConditionNegated>
            <Group>0</Group>
            <SessionCase>0</SessionCase>
         </SPT>
      </TriggerPoint>
      <ApplicationServer>
         <ServerName>sip : SBC@homedomain.com</ServerName>
         <DefaultHandling>0</DefaultHandling>
      </ApplicationServer>
</InitialFilterCriteria>
```

Fig. 11

Terminating Trigger Definition :

```
<InitialFilterCriteria>
   <Priority>1</Priority>
      <TriggerPoint>
         <ConditionTypeCNF>0</ConditionTypeCNF>
         <SPT>
            <ConditionNegated>0</ConditionNegated>
            <Group>0</Group>
            <Method>INVITE</Method>
         </SPT>
         <SPT>
            <ConditionNegated>0</ConditionNegated>
            <Group>0</Group>
            <SessionCase>1</SessionCase>
         </SPT>
      </TriggerPoint>
      <ApplicationServer>
          <ServerName>sip : SBC@homedomain.com </ServerName>
          <DefaultHandling>0</DefaultHandling>
      </ApplicationServer>
</InitialFilterCriteria>
```

Fig. 11 CONTINUE

LAWFULL CALL INTERCEPTION SUPPORT

This application is a continuation application of U.S. patent application Ser. No. 12/643,722 filed Dec. 12, 2009 now U.S. Pat. No 8,218,456 and has all priority and filing dates of the parent application and expressly incorporates the subject matter of the parent application in its entirety herein.

TECHNICAL FIELD

The present invention relates generally to telecommunications systems and in particular to methods and systems for lawful interception of communications.

BACKGROUND

As the level of technology increases, the options for communications have become more varied. For example, in the last 30 years in the telecommunications industry, personal communications have evolved from a home having a single rotary dial telephone, to a home having multiple telephone, cable and/or fiber optic lines that accommodate both voice and data. Additionally, cellular phones and Wi-Fi have added a mobile element to communications. With the advent of the Internet, IP networks have become an area in which these, and other services, and technologies are seen to be converging.

To accommodate the new and different ways in which IP networks are being used to provide various services, new network architectures are being developed and standardized. IP Multimedia Subsystem (IMS) is an architectural framework designed for delivering IP multimedia services to an end user. The IMS architecture has evolved into a service-independent topology which uses IP protocols, e.g., Session Initiation Protocol (SIP) signaling, to provide a convergence mechanism for disparate systems. In part this is accomplished via the provision of a horizontal control layer which isolates the access network from the service layer.

Lawful intercept functionality in telecommunication nodes is a legal requirement in many countries. Such intercept capability enables law enforcement agencies to obtain copies of and/or "listen in" to calls placed by (or to) identified individuals or phones. Thus, each telecommunication technology has specified its own solution to address the lawful interception legal requirements. On a high level, the lawful intercept functionality generally requires that nodes that handle the call control signaling be able to replicate the call data for intercept purposes and that nodes that handle the media flow be able to replicate the call content for intercept purposes.

The above described IMS technology also specifies its own solution for meeting lawful intercept requirements. For example, in the call control or signaling plane, a call session control function (CSCF) node is required to replicate the call data for lawful interception as shown in FIG. 1. Therein, a plurality of law enforcement monitoring functions (LEMF) 10, e.g., each associated with a government agency or police bureau, has access to an HI1 interface over which it can request that call interception be performed for a particular user, telephone number or device to initiate tracking of that entity. These requests are signaled over respective HI1 interfaces to an administrative function (ADMF) 12. The ADMF 12 correlates the requests from the various agencies via a mediation function and instructs the IMS node, in this example the P/S CSCF node 14, via an X1 or X1__1 interface to start intercepting (replicating) the control signaling associated with the target's calls that pass through, or are controlled by, that node.

When a call is initiated from or to a lawful intercept target that has been properly identified by the ADMF 12, the P/S CSCF node 14 replicates the control signaling associated with the intercepted call and forwards it on to the LEMF 10 over an X2 interface via a delivery function 16 and HI2 interface. Similar functionality is performed in IMS systems by the GPRS support node (GSN) 18, shown in FIG. 2, for intercepting the content portion (payload data) of a lawful intercept target's calls, which content is replicated and passed back to the requesting law enforcement via an X3 interface and delivery function 20.

Packet cable access technology also provides multimedia services and its specification can be found in the PacketCable forum (www.packetcable.com). Since packet cable provides telecommunication services, such systems must also comply with the legal requirements for lawful call intercept. Earlier versions of packet cable technology specified that certain packet cable nodes would be responsible for handling the call control associated with lawful intercept. For example, Packet Cable Version 1.5 specified a solution to address the lawful intercept legal requirements wherein a Cable Modem Termination System (CMTS) node replicated the call content for intercepted calls and a Call Management System (CMS) node replicated the call data for intercepted calls, as specified in a standard specification referenced as PKT-SP-ESP1.5-I02-070412. This architecture is described in more detail below.

More recently, Version 2.0 of the Packet Cable specification has been introduced. This version of the packet cable specification added IMS elements into its architecture as part of the convergence of these technologies, using some aspects of IMS verbatim and modifying other aspects of IMS to address cable specific issues. However Packet Cable Version 2.0 did not adopt the lawful intercept solution described above in FIGS. 1 and 2 for IMS, but instead evolved the existing packet cable lawful interception solution to handle the legal requirements associated with call intercept, as specified in a standard specification referenced as PKT-SP-ES-INF-I04-080425. Thus, in order to upgrade their networks from Packet Cable Version 1.5 to Packet Cable Version 2.0 to provide multimedia call service, network service providers also need to upgrade, for example, the CMTS node to provide for call interception of multimedia calls. This node upgrade may be time consuming and expensive.

Accordingly, it would be desirable to provide methods, systems and devices for supporting the required lawful interception functionality in packet cable networks without requiring upgrade of existing packet cable nodes, while also adhering to requirements associated with call security and privacy.

SUMMARY

Systems and methods according to the present invention address this need and others by providing techniques which enable an IMS node, e.g., a Session Border Controller (SBC), to replicate call content for lawful call interception.

According to one exemplary embodiment a method for lawful call interception in a packet cable network includes the steps of identifying, at a call session control function (CSCF) node, a call in a packet cable network whose call content is to be replicated for lawful interception, and transmitting a message toward a Session Border Controller (SBC) node, which message instructs the SBC node to replicate the call content for the call and to forward the call content toward a delivery function.

According to another exemplary embodiment, a call session control function (CSCF) node includes a processor configured to identify a call in a packet cable network whose data is to be replicated for lawful interception, and a communication interface, connected to the processor, configured to transmit a message toward a Session Border Controller (SBC) node, which message instructs the SBC node to replicate the call content for the call and to forward the call content toward a delivery function.

BRIEF DESCRIPTION OF THE DRAWINGS

The accompanying drawings illustrate exemplary embodiments, wherein:

FIGS. 7-11 are XML schema associated with shared initial filter criteria which can be used to initiate lawful call interception according to exemplary embodiments;

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

According to exemplary embodiments, lawful call intercept is supported in packet cable networks by enabling an IMS node, e.g., a Session Border Control (SBC) node (also sometimes referred to as a Session Border Gateway (SBG) node) to handle call content replication, rather than the CMTS node. In order to better understand these exemplary embodiments, a discussion is first provided below regarding nodes associated with call intercept in Packet Cable systems according to Versions 1.5 and 2.0.

Figure 3:
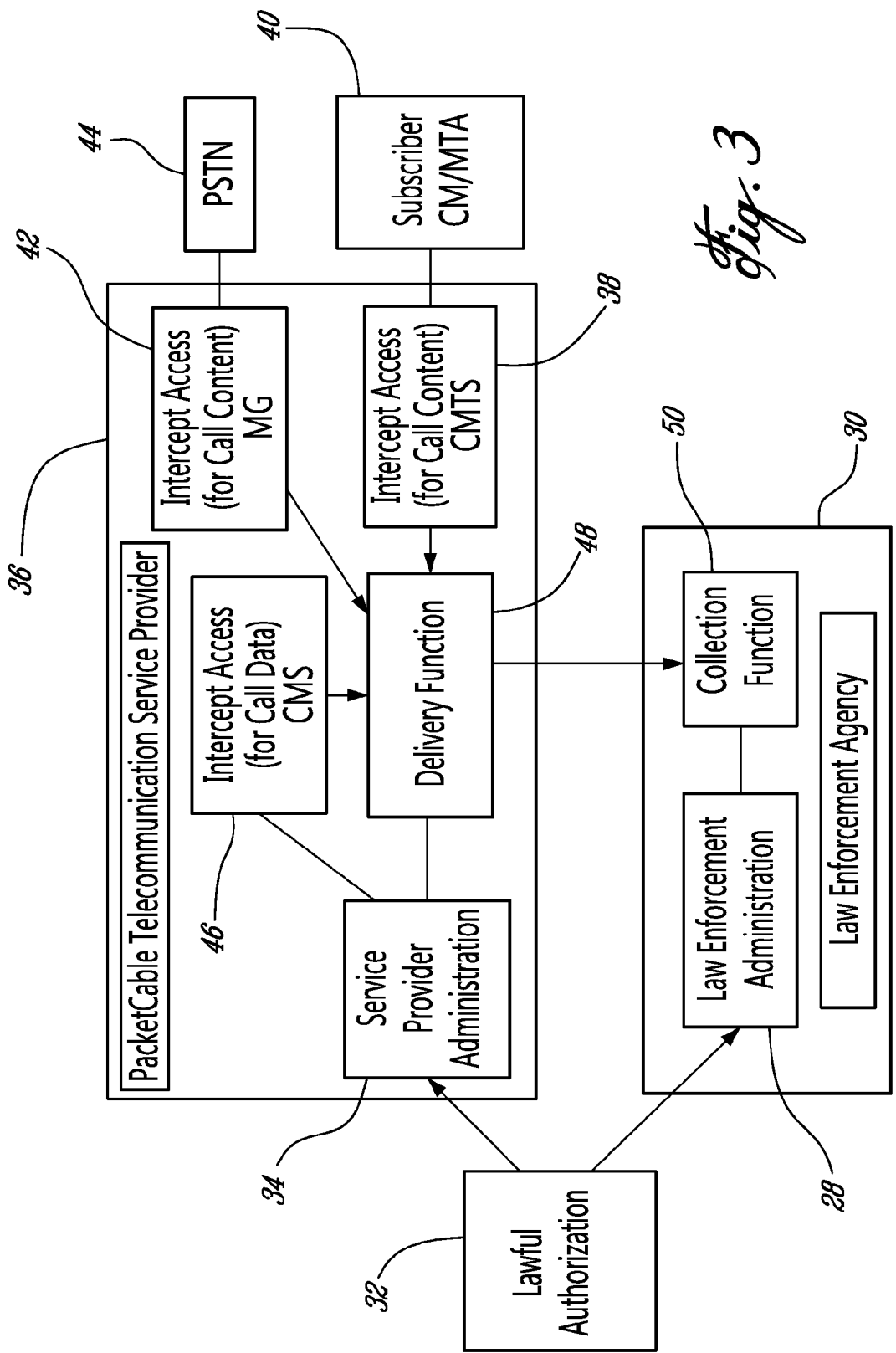
FIG. 3 depicts various intercept access points which support lawful call intercept in a packet cable 1.5 network.

Starting first with FIG. 3, Packet Cable 1.5 specifies the architecture shown therein to perform lawful call interception. An administration node 28 associated with a law enforcement agency (LEA) 30 obtains an authorization 32 to intercept calls associated with a target, which authorization is also communicated to a service provider administration node 34 within a packet cable telecommunication service provider's network 36. The packet cable network 36 uses three intercept access points (IAPB) to capture call information associated with legally authorized intercept targets. The CMTS 38, mentioned briefly above, captures call content received from subscriber equipment 40 including, e.g., cable modems (CMs) and multimedia terminal adapters (MTAs). Similarly, the Media Gateway (MG) 42 is responsible for replicating call content associated with calls that are redirected to or from the public switched telephone network (PSTN) 44. The third IAP is the CMS 46, also briefly mentioned above, which provides service to the packet cable subscribers and is responsible for capturing call data (i.e., identifying information). Each of the three IAPB 38, 42 and 46 provide information to a delivery function 48 for those calls which have been identified by the legal authorization 32 for interception. The delivery function 48 then formats and transmits that data to a corresponding collection function 50 at LEA 30.

Figure 1:
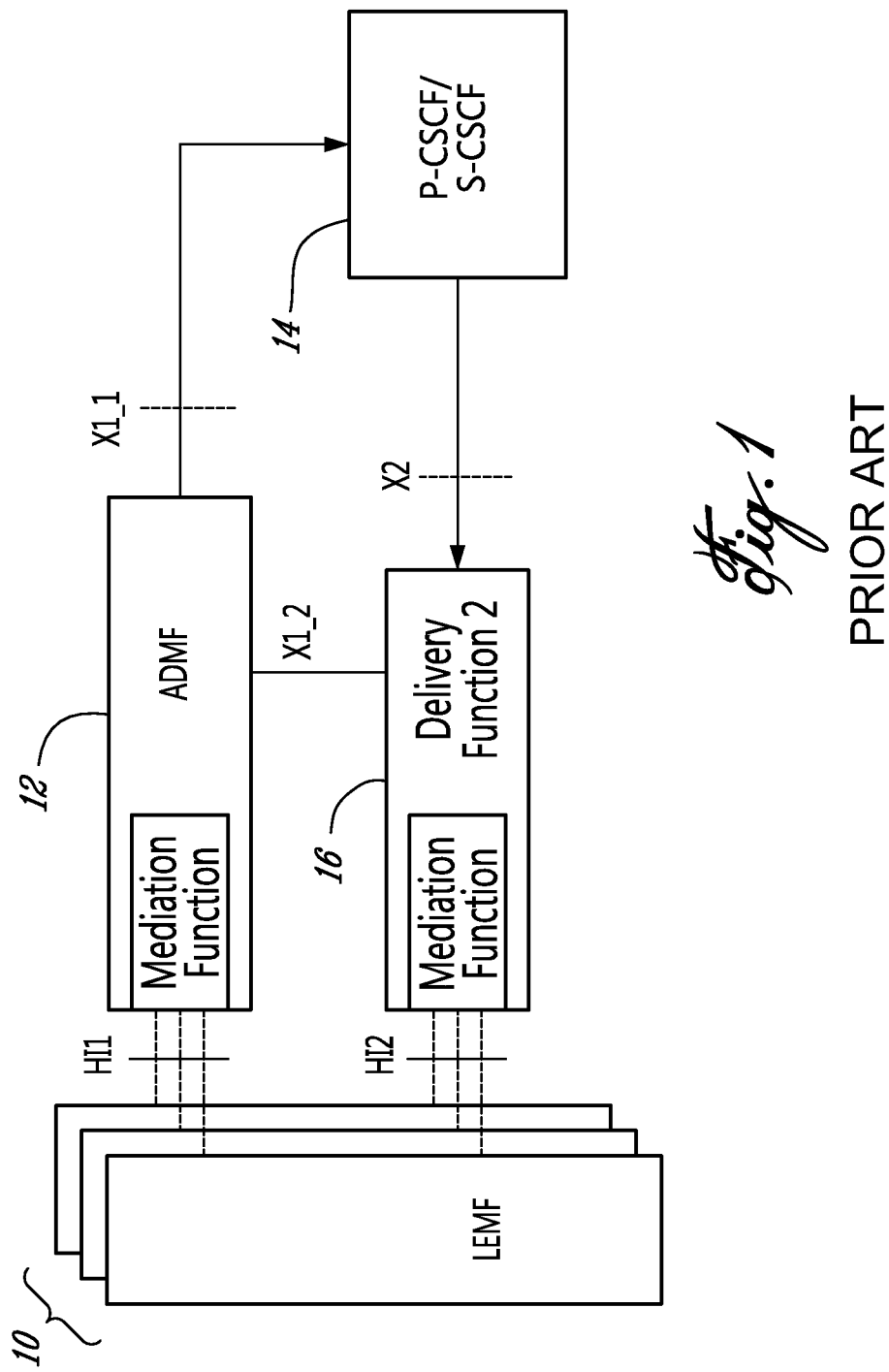
FIG. 1 illustrates call data replication in support of lawful call intercept in an IP Multimedia Subsystems (IMS) network.
Figure 2:
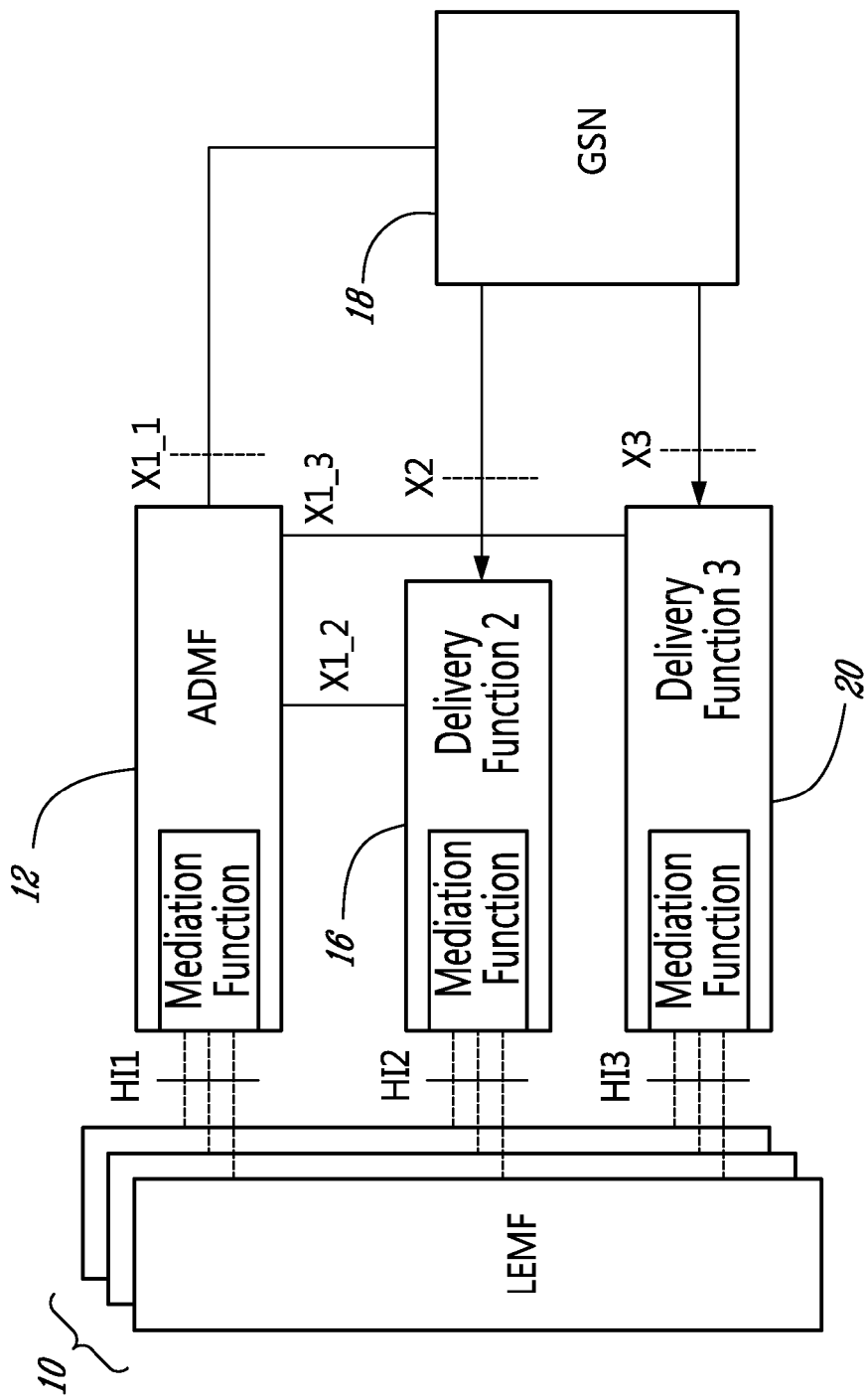
FIG. 2 illustrates call content replication in support of lawful call intercept in an IP Multimedia Subsystems (IMS) network.
Figure 4:
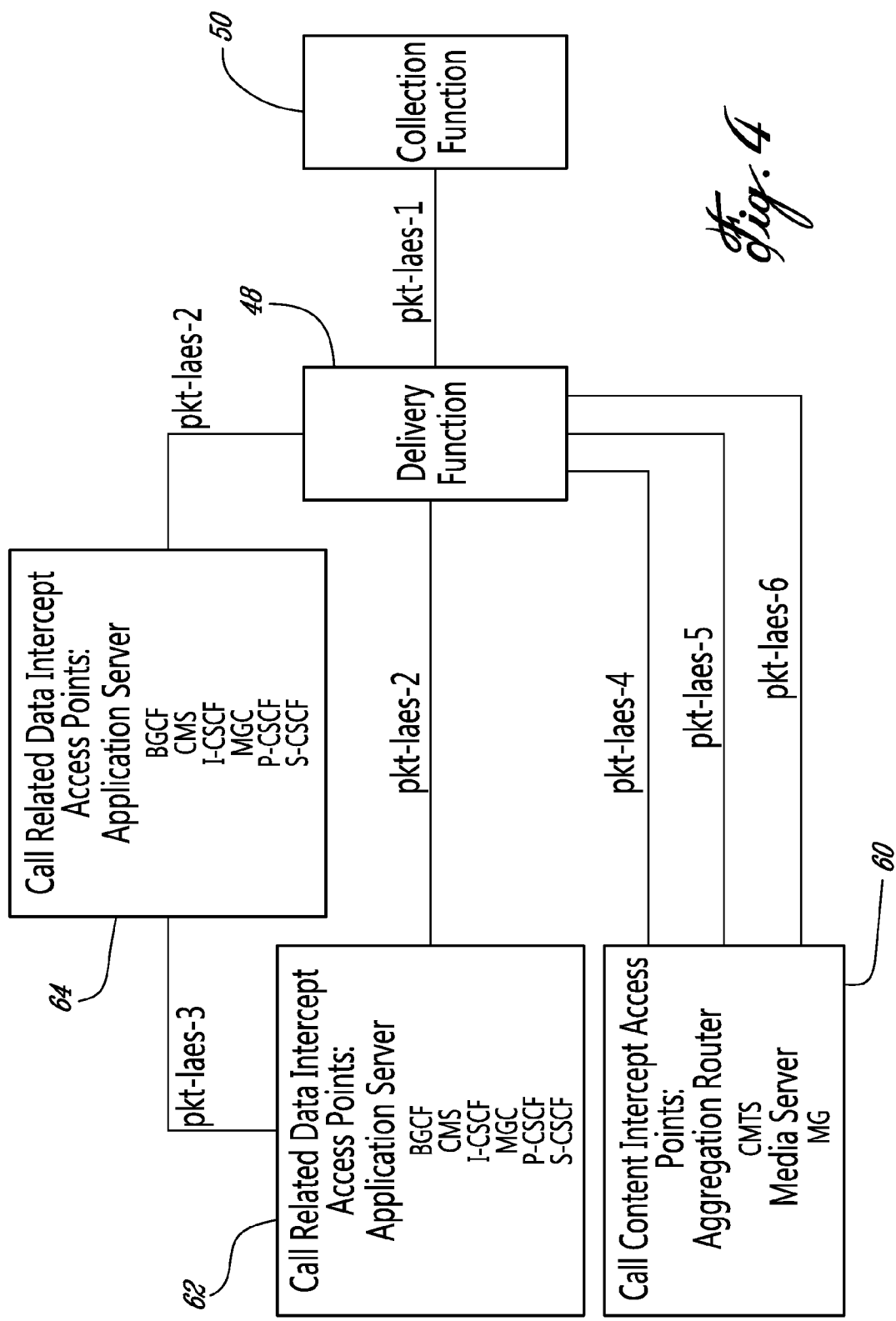
FIG. 4 depicts various intercept access points which support lawful call intercept in a packet cable 2.0 network which includes IMS nodes.

To handle multimedia calls, service providers can upgrade to PacketCable Version 2.0. Since PacketCable Version 2.0 specifies that, for example, the CMTS node 38 shall operate as an IAP for call content associated with targeted calls coming to/from subscriber equipment, service providers are faced with the need to upgrade the CMTS nodes 38 to also provide this functionality for multimedia calls. More specifically, Packet Cable Version 2.0 specifies the call intercept architecture shown in FIG. 4 (which is a copy of FIG. 1 from the document Packet Cable 2.0, Electronic Surveillance Intra-Network Specification, PKT-SP-ES-INF-104-080425, dated Apr. 25, 2008, the disclosure of which is incorporated here by reference). Therein, it can be seen that the CMTS 38 remains one of the packet cable IAPB 60 responsible for call content interception, whereas the IMS nodes such as the I/P/S CSCF play a role in providing the call related data to the delivery function 48.

Figure 5:
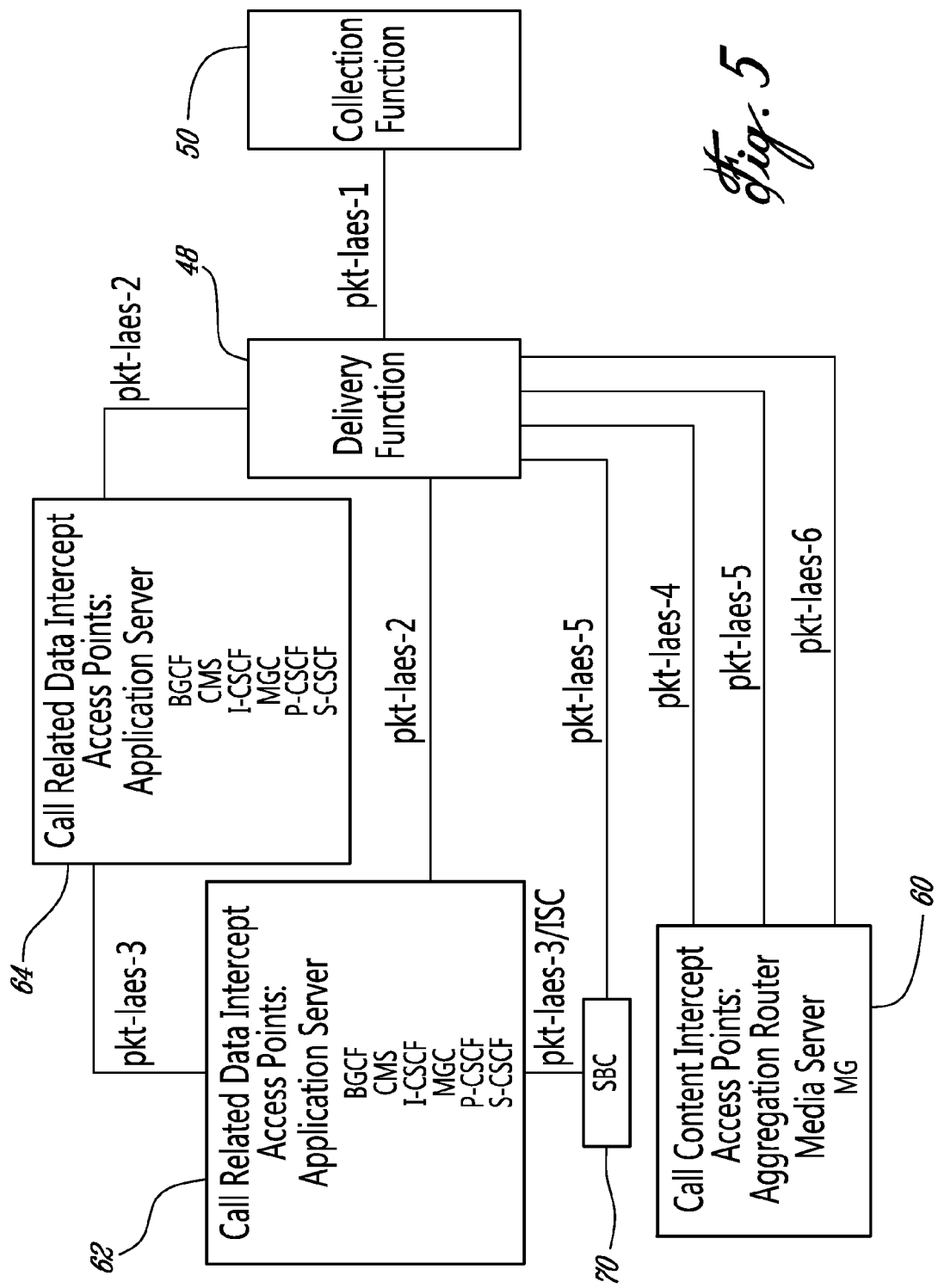
FIG. 5 depicts various intercept access points which support lawful call intercept in a packet cable 2.0 network which includes IMS nodes according to an exemplary embodiment.

According to an exemplary embodiment, an IMS node may provide call content replication for intercepted calls (instead of the CMTS) as shown architecturally in FIG. 5. Therein, the SBC 70 can be linked into the call path by a CSCF 62 for call content replication purposes using, for example, a pkt-laes3 interface (reference point) over Initial Filter Criteria (IFC) interface according to this exemplary embodiment, which interface is also referred to herein as the "pkt-laes3/ISC" interface. Basically, the pkt-laes3/ISC interface is an ISC interface modified to include an additional header, which header is described in more detail below. The pkt-laes3/ISC interface can, for example, be used to order the SBC 70 to perform the call content replication for a particular call. The ISC interface, which is normally used to invoke an application server, is used according to this exemplary embodiment to invoke the SBC 70. The SBC 70 will then replicate the indicated call content and deliver that replicated content to the delivery function 48 over a pkt-laes5 interface, i.e., instead of the CMTS which is omitted from FIG. 5 to indicate that its role as an IAP is replaced by the SBC 70 according to this exemplary embodiment.

Figure 6:
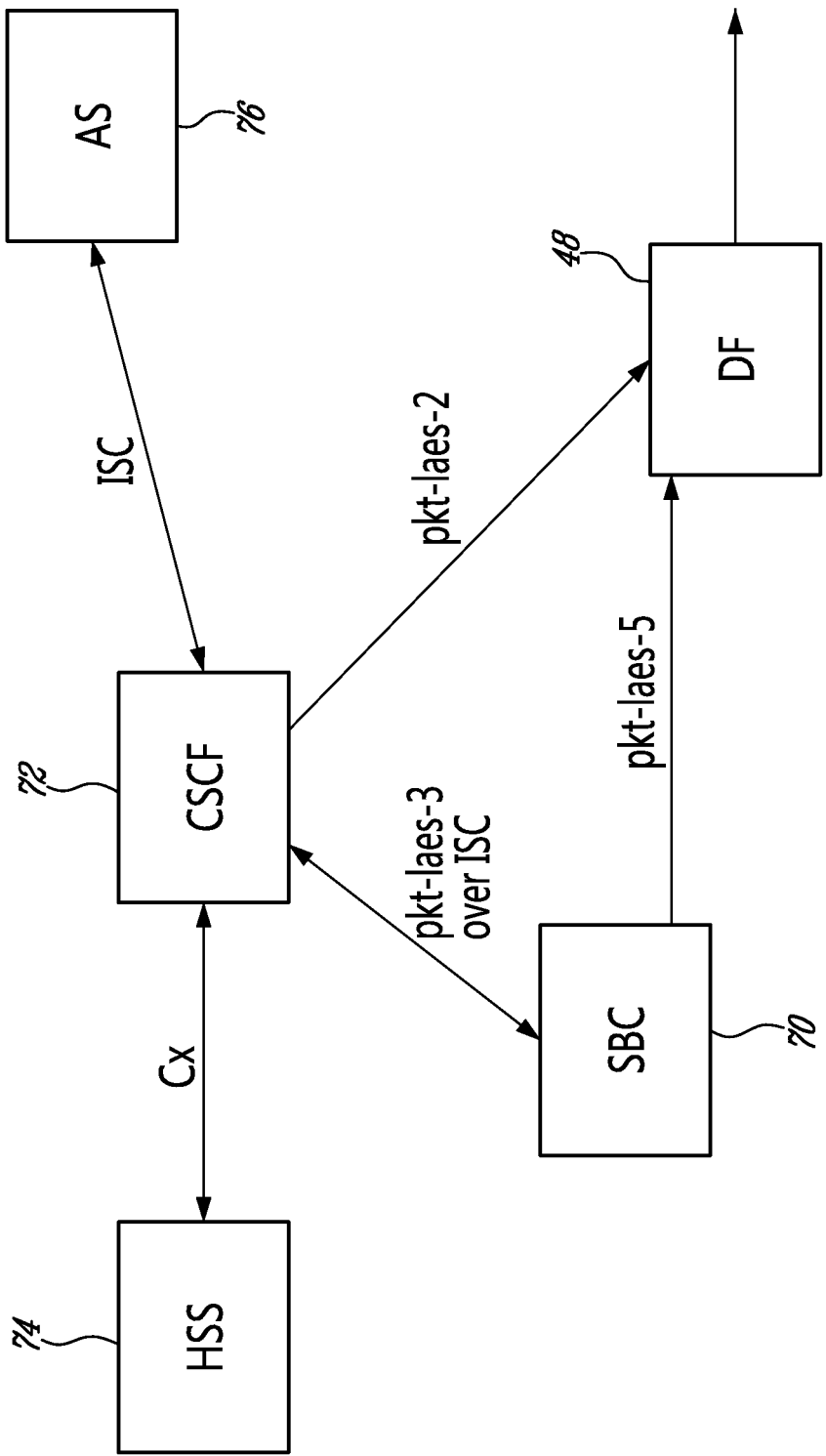
FIG. 6 shows various nodes interacting according to an exemplary embodiment to support lawful call interception.

FIG. 6 illustrates some of the IMS nodes of interest operating in a packet cable system including a delivery function 48 which provides call data and/or content as described above to law enforcement agencies. According to exemplary embodiments as will be described in detail below, special shared IFC indexes are reserved to trigger call replication by the SBC 70 for lawful intercept functions. These special shared IFC indexes are configured in the CSCF node 72 by personnel who have the administrative rights for lawful interception feature, rather than being downloaded from the home subscriber system (HSS) 74, which is a database that typically provides user data to the rest of the system, i.e., via the S-CSCF. When a user is targeted for call content lawful interception, the user's service profile is modified to include the lawful intercept triggers, in addition to any other services which may be indicated by that users IFCs (explicit or shared) that are downloaded by from the HSS.

More specifically, according to an exemplary embodiment, when the (S-)CSCF 72 has determined that call content interception (in addition to call data interception) is required for a particular call being processed by the packet cable network, the (S-)CSCF 72 sends call data intercept event messages to the delivery function 48. According to one exemplary embodiment, the S-CSCF 72 then executes service trigger functionality to initiate call services invoked by the incoming call (e.g., call forwarding, etc.), if any such services are indicated by the user's profile, by sending messages to an application server (AS) 76 over an IP multimedia Service Control (ISC) interface. Prior to this service triggering being completed, the linking of the SBC 70 into the call content path is performed. Alternatively, the SBC 70 can be linked into the call content path after in the service sequence depending upon the configured priority level of the lawful intercept trigger, as will be described below. The SBC 70 can, for example, be instructed to be linked into the call content path and to replicate call content for a particular call in a packet cable communication system by the S-CSCF 72 sending a SIP header referred to as the P-DCS-LAES to the SBC via the pkt-laes3 interface. The existing ISC interface thus is reused and transformed into a pkt-laes3 interface by the presence of the P-DCS-LAES header in the SIP message.

The P-DCS-LAES header can, for example, be formatted as:

P-DCS-LAES="P-DCS-LAES" HCOLON Laes-sig*
(SEMI Laes-param)

where:
Laes-sig=hostport
Laes-param=Laes-content/Laes-key/Laes-cccid/Laes-bcid/generic-param
Laes-content="content" EQUAL hostport
Laes-key="key" EQUAL token
Laes-bcid="bcid" EQUAL 1*48(HEXDIG)
Laes-cccid="cccid" EQUAL 1*8(HEXDIG)

| P-DCS-LAES header | Optionality | Description |
| --- | --- | --- |
| P-DCS-LAES | | |
| Laes-sig | Mandatory | DF host (FQDN domain or IP address) and port for call-data interception. |
| Laes-param | Optional | List of parameters |
| Laes-content | Optional | DF host (FQDN domain or IP address)and port for call-content interception. |
| Laes-Key | N/A | Deprecated. |
| Laes-bcid | Optional | Packet Cable 1.5 Billing Correlation Identity. |
| Laes-cccid | Conditional to presence of Laes-content. | Identifier of the intercepted call content. |

Of particular interest in this exemplary header message, note the DF 48's address/identity which indicates to SBC 70 where to send replicated call content and, optionally, the identifier of the intercepted call content which is desired.

The messages sent over the pkt-laes3/ISC interface, e.g., to SBC 70 and over the ISC interface with AS 76, are controlled via initial filter criteria. In general, initial filter criteria (iFC) can be either downloaded in the explicit format or in non-explicit (i.e. shared) format from the HSS 74 during the registration process. The shared iFC are pre-configured in the S-CSCF 72 as part of the shared iFC feature. Such shared iFCs enable the HSS 74 to transmit simple indicators associated with a user's service profile over the link between the HSS 74 and CSCF 72, rather than transmitting the full service profile for each user, thereby saving bandwidth on that link. A general XML structure for initial filter criteria as defined in 3GPP TS 29.229 is shown in FIG. 7 and includes information such as the address of the application server and the priority of the trigger. Details of the tApplicationServer parameter of FIG. 7 are illustrated in FIG. 8.

According to exemplary embodiments, two specific intercept service point iFC triggers are provided to enable lawful interception via the SBC 70. One iFC trigger is used to handle originating SIP INVITE requests for targeted lawful intercepts and the other iFC trigger is used to handle terminating SIP INVITE requests for targeted lawful intercepts. According to one exemplary embodiment, the lawful intercept iFC for originating SIP INVITE messages and/or for terminating SIP INVITE messages can have configurable priority values. For example, when a lawful intercept iFC trigger is configured with the lowest priority, it is executed as the last service after all services associated with the call to be intercepted have been executed by the relevant application servers. Alternatively, when a lawful intercept iFC trigger is configured with the highest priority, it is executed as the first service before that of the first application server.

To generate lawful intercept iFC triggers according to exemplary embodiments the templates shown in FIGS. 7 and 8 can be used. For example, the ServerName (see FIG. 8) included in the ApplicationServer parameter (see FIG. 7) can be configured to hold the name (or IP address and port) of the SBC 70 which will perform the call content replication for the user and/or device which has been identified for lawful call intercept. According to this exemplary embodiment, both the originating and terminating IFC have the AS Default Handling parameter set to SESSION_CONTINUED. The terminating INVITE iFC can also have the SessionCase attribute (see FIG. 10) of the TriggerPoint parameter (see FIG. 9) set to SESSION_REGISTERED so that the trigger is not executed for unregistered users. The special iFCs associated lawful call interception may have configurable priority values, e.g., by setting the tPriority parameter in FIG. 7. For example, it may be desirable to execute interception of a call before any other services associated with that call are performed by other application servers, i.e., the special iFCs could be given the highest priority value. Alternatively it may be desirable to execute interception of a call after all other services associated with that call are performed by other application servers, i.e., the special iFCs could be given the lowest priority value. All other iFC parameters shown in FIGS. 7 and 8 can be set to predetermined values or left empty. Thus, according to one exemplary embodiment, an originating trigger and a terminating trigger can be defined as shown in FIG. 11, although those skilled in the art will appreciate that other definitions are also possible.

Figure 12:
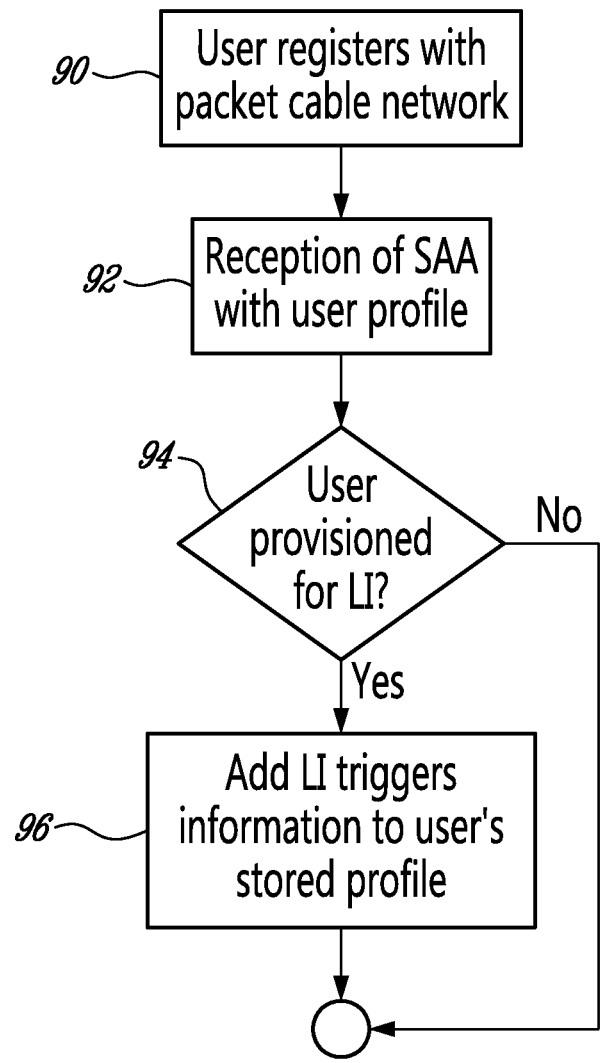
FIGS. 12 and 13 are flowcharts illustrating adding lawful intercept triggers to a user's profile according to exemplary embodiments.

As mentioned above, the special shared lawful intercept iFC can be created by authorized personnel and stored in the CSCF 72 upon activation of the lawful intercept function in the CSCF 72. These triggers can then be used as shown in the flowchart of FIG. 12 to implement lawful call interception according to exemplary embodiments. When a user registers with the packet cable network (step 90), the shared iFC data stored in the CSCF 72 is referenced by the user's service profile at step 92. If the user is also provisioned for call content lawful interception (step 94), the user's service profile shall create a reference to the lawful intercept originating and terminating INVITE shared initial filter criteria at step 96. In this way, the next time that a targeted user makes or receives a call, the user's service profile will indicate that interception is required and the aforedescribed signaling will occur toward the SBC 70.

Figure 13:
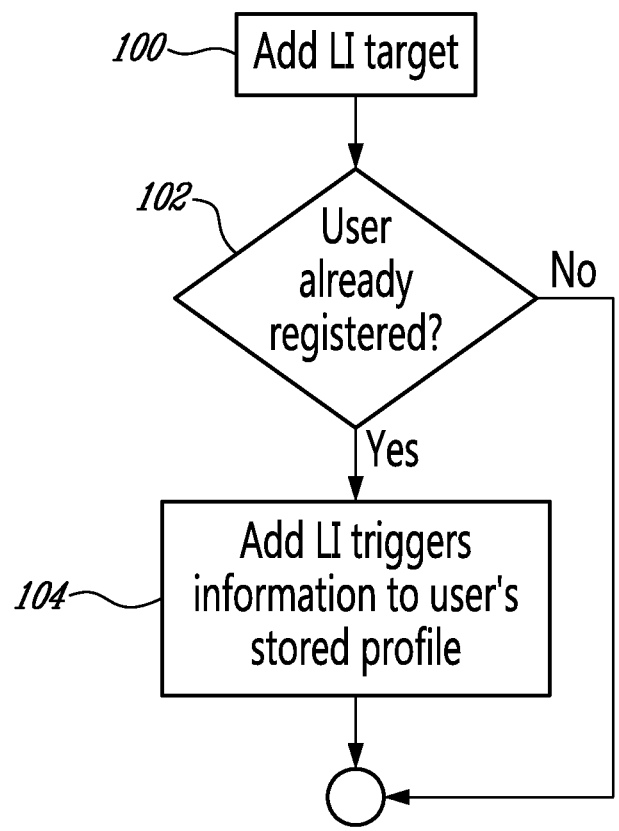

Exemplary embodiments also contemplate the possibility that the legal authorization for call interception may be received by the packet cable network when a targeted user is already registered with the packet cable network. In that case, as shown in the flowchart of FIG. 13, it may be desirable to start intercepting calls immediately rather than waiting for the user to re-register with the network later. Therein, when the legal authorization is received at step 100, a check can first be performed, at step 102, to determine whether the user who has now been identified for lawful call interception, is already registered. If not, the process can end, e.g., to begin the process shown in FIG. 9 to await registration of that user. Otherwise, if that user is currently registered with the packet cable network, the process can go to step 104 where the aforedescribed lawful intercept triggers can be added to the user's stored profile and his or her calls can be forwarded to the LEA via the delivery function.

Figure 14:
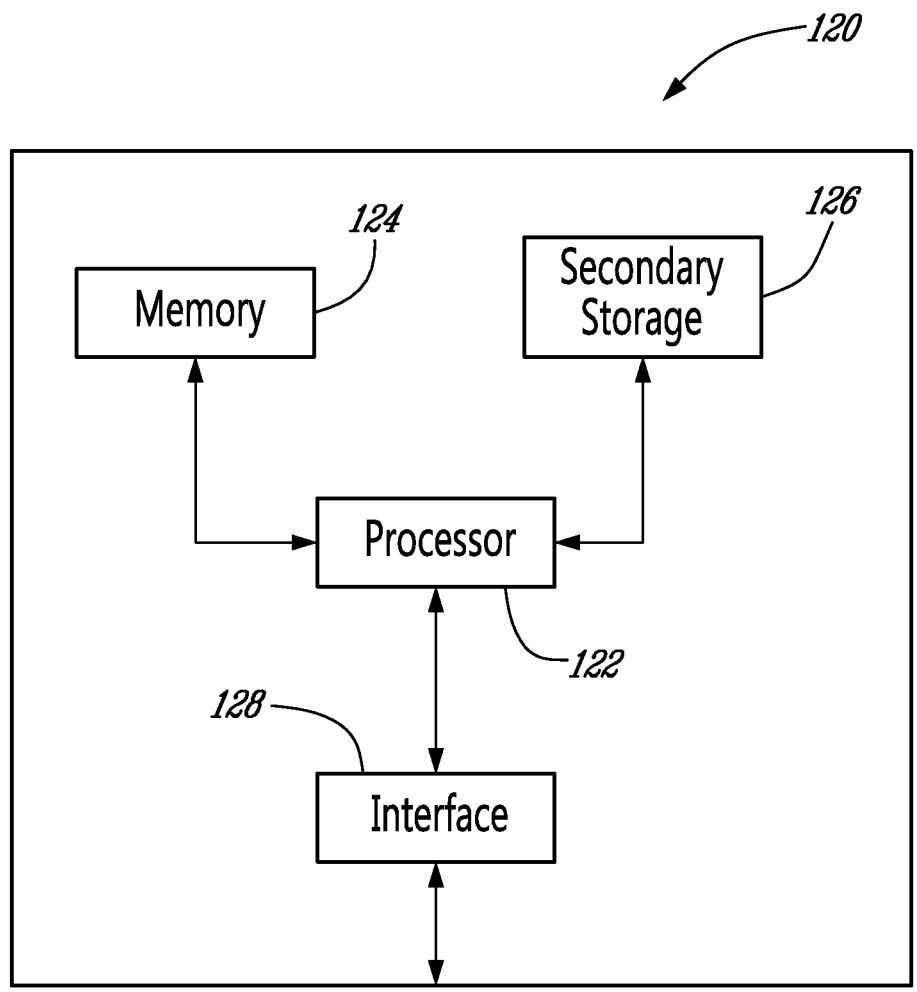
FIG. 14 depicts a communications node according to exemplary embodiments.

The exemplary embodiments described above provide for lawful call interception in packet cable networks using an IMS node to perform call content replication. An exemplary communications node 120, e.g., an SBC 70 or a CSCF 72, will now be described with respect to FIG. 14. Communications node 120 can contain a processor 122 (or multiple processor cores), a memory 124, one or more secondary storage devices 126 and an interface unit 128 to facilitate communications between communications node 120 and other networks and devices. Additionally, the communications node 120 can contain logic and protocols to operate as an SBC 70 in a packet cable network which includes IMS nodes. Thus, when the communications node 120 is operating as the CSCF 72, the interface unit 128 of the communications node 120 may include a pkt-laes3/ISC interface for instructing the SBC 70 to replicate identified call content and forwarding same to a delivery function 48 at a specified address or port. When the communications node is operating as the SBC 70, the processor 122 can be configured to replicate the call content according to messages received from the CSCF 72 over the ISC interface as described above.

Figure 15:
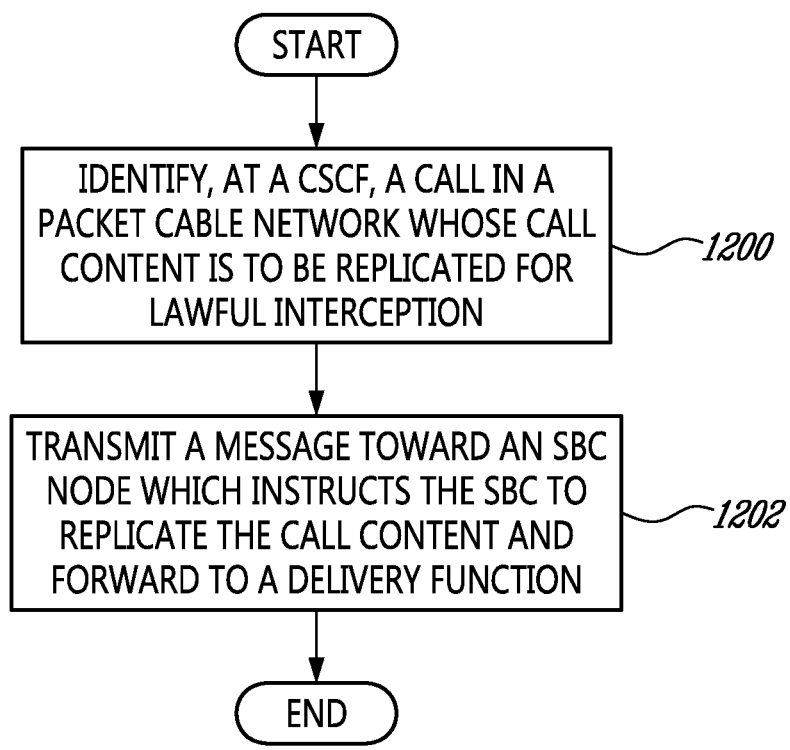
FIG. 15 shows a method for legal call interception according to exemplary embodiments.

Utilizing the above described techniques and according to exemplary embodiments, a method for lawful call intercept in a packet cable network is shown in the flow chart of FIG. 15 from the perspective of the CSCF node. Therein, at step 1200, a call session control function (CSCF) node identifies a call in a packet cable network whose call content is to be replicated for lawful interception. The CSCF transmits, at step 1202, a message toward a Session Border Controller (SBC) node, which message instructs the SBC node to replicate the call content for the call and to forward the call content toward a delivery function.

The above-described exemplary embodiments are intended to be illustrative in all respects, rather than restrictive, of the present invention. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A method for call content lawful interception, comprising:

downloading a service profile associated with a user by a call session control function (CSCF) node;

modifying the service profile to include a lawful interception service trigger in response to the user being targeted for call content lawful interception; and responsive to identifying a call associated with the user, transmitting a message to a Session Border Controller (SBC) node, in accordance with the lawful interception service trigger, the message instructing the SBC node to replicate call content of the identified call.

2. The method of claim 1, wherein the message further instructs the SBC to forward the call content to a delivery function.

3. The method of claim 1, wherein the SBC is linked into a call content path only for calls which are targeted for lawful interception.

4. The method of claim 1, wherein the step of modifying the service profile is performed responsive to the user registering with a network.

5. The method of claim 1, further comprising the step of generating at least one shared Initial Filter Criteria (sIFC) in the CSCF node, the at least one sIFC includes the lawful interception service trigger which operates as a trigger to transmit the message to the SBC node.

6. The method of claim 5, wherein the step of generating further comprises setting a ServerName parameter in the at least one sIFC to one of: (a) a name associated with the SBC node, or (b) an IP address and port associated with the SBC node.

7. The method of claim 5, wherein the step of modifying the service profile includes adding the at least one sIFC to the service profile associated with the user.

8. The method of claim 1, further comprising the step of transmitting a SIP INVITE request message associated with the identified call through an IP multimedia Service Control (ISC) interface toward the SBC node.

9. The method of claim 8, wherein the ISC interface provides a capability to transmit a SIP header including information associated with an address of a delivery function.

10. A call session control function (CSCF) node comprising:

a communication interface for downloading a service profile associated with a user;

a processor for modifying the service profile to include a lawful interception service trigger in response to the user being targeted for call content lawful interception and, responsive to identifying a call associated with the user, for transmitting a message through the communication interface to a Session Border Controller (SBC) node, in accordance with the lawful interception service trigger, the message instructing the SBC node to replicate call content of the identified call.

11. The CSCF node of claim 10, wherein the message further instructs the SBC to forward the call content to a delivery function.

12. The CSCF node of claim 10, wherein the SBC is linked into a call content path only for calls which are targeted for lawful interception.

13. The CSCF node of claim 10, wherein the processor modifies the service profile in response to the user registering with a network.

14. The CSCF node of claim 10, wherein the processor is configured to generate at least one shared Initial Filter Criteria (sIFC), the at least one sIFC includes the lawful interception service trigger which operates as a trigger to transmit the message to the SBC node.

15. The CSCF node of claim 14, wherein the processor is configured to set a ServerName parameter in the at least one sIFC to one of: (a) a name associated with the SBC node, or (b) an IP address and port associated with the SBC node.

16. The CSCF node of claim 14, wherein the processor modifies the service profile by adding the at least one sIFC to the service profile.

17. The CSCF node of claim 10, wherein the communications interface includes an IP multimedia Service Control (ISC) interface and the processor is configured to transmit a SIP INVITE request message associated with the identified call through the ISC interface toward the SBC node.

18. The CSCF node of claim 17, wherein the SIP INVITE request message includes an address associated with a delivery function.

* * * * *